United States Patent [19]

Carlston

[11] Patent Number: 4,998,997
[45] Date of Patent: Mar. 12, 1991

[54] SIDE BEARING UNIT FOR RAILROAD CAR

[75] Inventor: Robert L. Carlston, Skokie, Ill.

[73] Assignee: Miner Enterprises, Inc., Geneva, Ill.

[21] Appl. No.: 489,799

[22] Filed: Mar. 5, 1990

Related U.S. Application Data

[63] Continuation of Ser. No. 310,986, Feb. 15, 1989, abandoned.

[51] Int. Cl.⁵ ............................. F16F 1/36; F16F 1/40
[52] U.S. Cl. .................................. 267/003; 105/198.7;
248/635; 267/141.1; 267/141.6; 267/293;
267/294; 280/716
[58] Field of Search ................. 267/292, 293, 294, 3,
267/140, 141.1, 141.2, 141.6, 153, 257, 258;
180/300, 312, 902; 280/671, 716; 248/635;
105/198.7

[56] References Cited

U.S. PATENT DOCUMENTS

| | | | |
|---|---|---|---|
| 1,930,098 | 10/1933 | Hossfeld | 267/293 X |
| 2,605,734 | 8/1952 | Watkins | 267/292 X |
| 2,618,393 | 11/1952 | Withall | 267/292 X |
| 2,926,973 | 3/1960 | Ellis . | |
| 3,140,866 | 7/1964 | Zollner | 267/293 X |
| 3,724,833 | 4/1973 | Sergay | 267/140 |
| 3,735,711 | 5/1973 | Hassenauer . | |
| 3,865,443 | 2/1975 | James . | |
| 4,566,678 | 1/1986 | Anderson | 267/141.1 |
| 4,712,487 | 12/1987 | Carlson . | |

FOREIGN PATENT DOCUMENTS

| | | | |
|---|---|---|---|
| 2138854 | 6/1972 | Fed. Rep. of Germany | 267/3 |
| 1276628 | 10/1961 | France | 267/293 |
| 136387 | 7/1952 | Sweden | 267/292 |

*Primary Examiner*—George E. A. Halvosa

[57] ABSTRACT

A top cap and housing cooperate to create an internal void wherein is located two elastomeric springs, one on top of the other. Two different solid stop systems are incorporated into the top and housing. An interlocking system also movably secures the top cap and housing such that the two thermoplastic elastomeric springs can be subjected to a preload. The thermoplastic elastomeric springs are designed and housed so that through a cycle from free height to solid height they are folded and flexed rather than compressed.

2 Claims, 3 Drawing Sheets

SIDE BEARING UNIT FOR RAILROAD CAR

This application is a continuation of application Ser. No. 07/310,986, filed 2/15/89 now abandoned.

BACKGROUND OF THE INVENTION

This invention relates to railroad cars and particularly to articulated railroad cars and to side bearing units used therewith. A side bearing unit is attached to the bolster of each truck whereby regulating independent movement of the body of the car and impeding truck hunting. Side bearing units have been used to regulate movement between the body of a railroad car and the trucks for a substantial period of time. These side bearing units are of various designs and structure as based upon the type of car they are associated with, the weight it carries, etc.

Recently, a new type of railroad car has been put into service which creates unique demands upon the side bearing employed. These cars are generically known as articulated cars, they are lightweight, of high technology design and offer a new series of challenges for side bearings For example, it has been found that the connectors between the articulated cars are prone to wear, whereby the male end of the articulated connector will tend to settle and, in fact, lose as much as $\frac{3}{8}$" in vertical height. This results in lowering of the male end of the car body relative to the side bearing. The drop in vertical height has the potential of compressing a standard side bearing beyond its normal limits of travel and thus render it useless for its designed objective. For example, the weight of the entire car will be carried by the side bearings and not by the center plate of the bolster. A further demand use for increased travel on articulated cars has been found when the car is run through a super elevated curve. Articulated cars with standard 5/16" travel constant contact side bearings have been noted to derail while passing through such a curve.

In articulated car applications, there is a necessity of mounting the side bearings off the centerline of the bolster. This may result in a twisting moment in the bolster, thus requiring increased side bearing travel Increased side bearing travel is one of the situations which must be satisfied in articulated car service. The side bearing of this invention addresses this problem in a way in which no other side bearing has been designed to accomplish. It should be noted that side bearings used today in interchange must meet all of the requirements of the Association of American Railroads M-948 Specification.

SUMMARY OF THE INVENTION

The side bearing unit of this invention is designed to meet the unique demands of articulated car service. Foremost in the features is the ability to provide a full $\frac{3}{8}$" travel from installed height while experiencing only minimal increase in resistant forces over the initial preload. The side bearing itself includes a generally round top cap that has a flat center portion, and side angled portions which extend into a downwardly depending integrally formed side wall. The particular structure of the top cap provide constant frictional control and tolerance to side bearing arm misalignment. The bottom surface of the top cap includes a first primary stop adjacent to the side wall and a centrally located downwardly depending secondary solid stop, both of which cooperate with a stop means provided in the housing as hereafter discussed.

The housing itself includes a base portion suitable for attachment to the top wall of a railroad car bolster. Also included is an integrally formed outwardly extending side wall which has a primary stop portion and a centrally located upwardly extending secondary stop. As mentioned above, both of these stop means cooperate with those located in the top cap to provide solid positive stops in the event of a massive overload of the side bearing unit. The center secondary stop is uniquely located to prevent the top cap from being crushed inwardly should such overload conditions take place.

The top cap and the housing cooperate whereby the housing fits within the top cap to create an internal void. This internal void is occupied by first and second thermoplastic elastomer springs which due to their design can be folded and flexed a substantial amount without a rapid increase in their resistive forces. The thermoplastic elastomer material which is employed for the springs herein disclosed is that specified in U.S. Pat. No. 4,198,037 dated Apr. 15, 1980 by David G. Anderson and U.S. Pat. No. 4,566,678 dated Jan. 28, 1986 by David G. Anderson. These patents and these teachings are incorporated herein by reference.

Lastly, a means is provided for connecting the top cap and housing whereby a preload can be exerted on said first and second thermoplastic elastomeric springs. The free height of the side bearing is $\frac{3}{8}$" higher than the 51/16" set-up height thus allowing the side bearing to exert an upward force on the car body wear plate during severe car rocking The frictional control to resist truck hunting is thus not lost during car rocking. However, the top cap is still free to move with respect to the housing as an external force is exerted thereon, either due to a drop in vertical height through wear of the components in the articulated car, because of car rocking, etc.

DESCRIPTION OF THE PREFERRED EMBODIMENT

Figure 1:
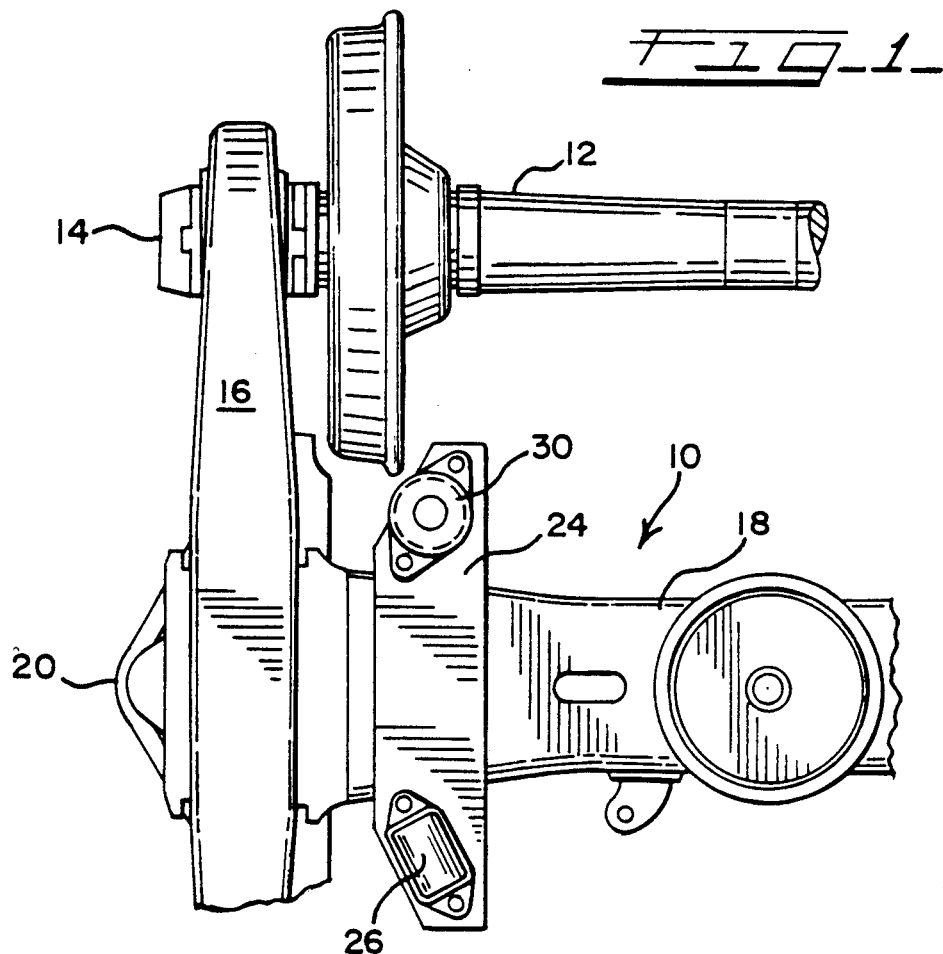
FIG. 1 is a plan view of a portion of a railroad car truck which includes a side bearing unit of this invention.
Figure 2:
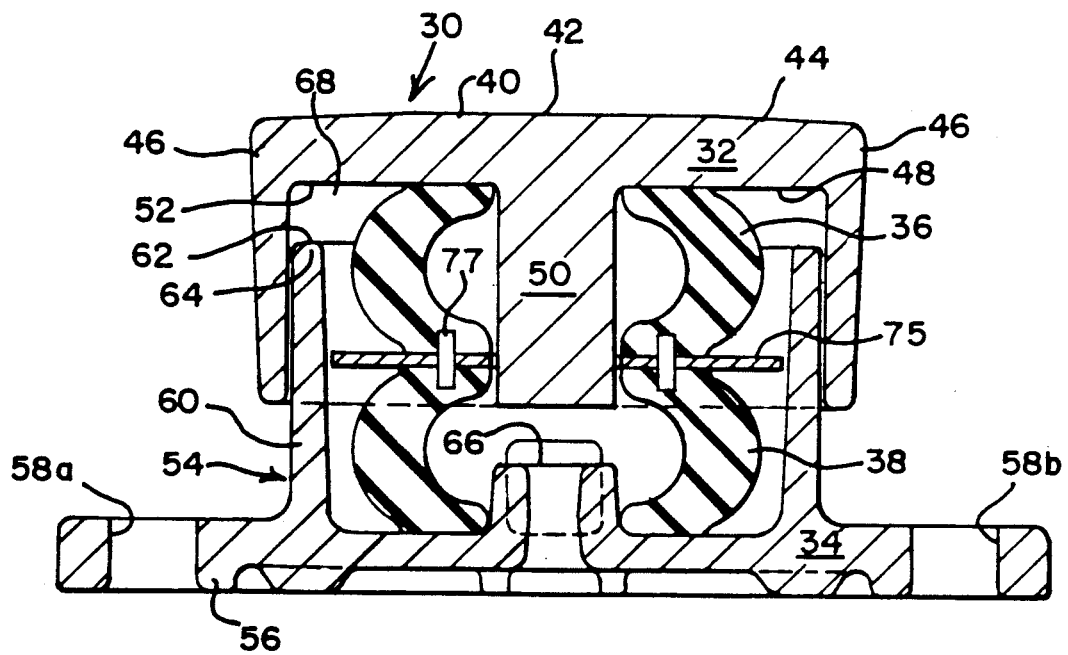
FIG. 2 is an elevational view in section as seen generally along the lines 2—2 of FIG. 5.

In FIG. 1 a portion of a railroad car truck 10 is seen generally and comprises a wheel set, a part of which is shown and designated 12. The wheel set 12 as shown in FIG. 1, has an axle end 14 journaled in a bearing carried by a side frame 16. As is appreciated, the truck 10 includes a pair of such side frames which are connected by transversely positioned bolster partially shown and designated 18. An end 20 of the bolster 18 is resiliently carried in a window of the side frame 16 in a well-known manner.

A side bearing mount 24 is secured to the bolster 18 by any suitable means and functions as the support for the side bearing unit 30 A conventional constant contact side bearing unit 26 is also supported by the side bearing mount 24.

The side bearing unit 30 shown in greater detail in FIGS. 2, 4, 5 and 6 includes a round top cap 32, a housing 34 and first and second thermoplastic elastomeric springs 36 and 38. The generally round top cap 32 includes a top surface 40 which has a center flat portion 42, plus a side angle portion 44. The center flat portion 42 occupies approximately 21%, plus or minus 5%, of the total top surface. The remainder being occupied by the angled side portion which forms an angle 35 (FIG. 6) of about 3 degrees, plus or minus 1 degree, with respect to said center flat portion. The combination of the flat and tapered surfaces provide constant frictional control and tolerance to misalignment of parts, etc. during a normal functioning cycle. This provides for metal-to-metal contact on the car body wear plates to control truck hunting and to reduce the rock angle of the car. A downwardly depending integrally formed side wall 46 drops down from said top surface 44. A bottom surface 48 has a centrally located integrally formed depending secondary solid stop 50 and a primary stop surface 52 which is adjacent said side wall 46 and extends a full 360 degrees around said round top cap 32. The function of the primary and secondary stops will hereafter be more fully explained.

A housing 54 includes a base portion 56 which is prepared for attachment to the side bearing mount 24 via any suitable means The holes 58a and 58b are provided for this purpose. The housing 54 further includes an integrally formed upwardly extending side wall 60 which includes a primary stop portion 62 located at the top edge 64 thereof. This primary stop portion 62 extends 360 degrees around the housing and is designed to cooperate with the primary stop 52 located on the bottom surface 48. Centrally located is an integrally formed upwardly extending secondary stop 66 that cooperates with the depending secondary stop 50 These stops cooperate to prevent crushing in of the top surface 42 when the primary stops have bottomed out and an extreme load is present. As previously mentioned, the top surface has a 3 degree taper whereby such crushing action is accentuated.

Figure 7:
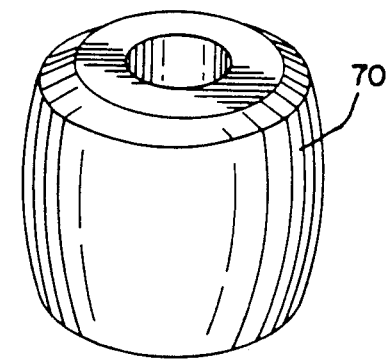
FIG. 7 is a perspective view of the thermoplastic elastomer spring as employed in the side bearing shown in FIG. 2.

The housing 54 fits within the round top cap 32 whereby creating an internal void 68. The first and second thermoplastic elastomeric springs 36 and 38 ar situated within this internal void in a piggyback or one on top of the other position. Both thermoplastic elastomeric springs are identical and therefore description will be limited to one with the understanding that it is equally applicable to the other. By placing them in series, the available travel of the side bearing can be doubled and the spring rate cut in half. The two elastomeric springs are separated by a plate 75 and both are mechanically locked to the plate by pins 77, or any other suitable means, thus forming an elastomer spring assembly. Referring to FIG. 7, it is apparent that the elastomeric spring is an open-ended hollow tube.

Figure 6:
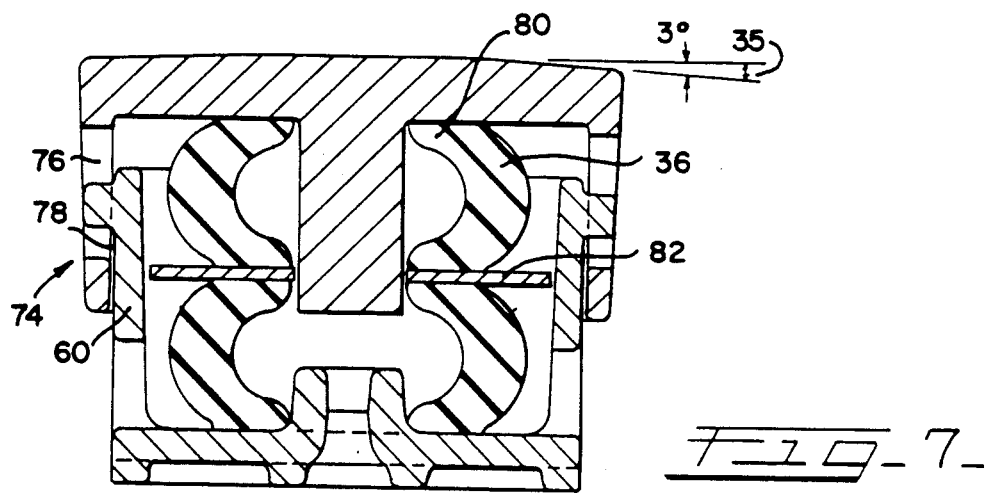
FIG. 6 is a sectional view as seen generally along the lines 6—6 of FIG. 5.

The thermoplastic elastomer spring 36, shown, for example, in FIG. 6, is designed to fold and flex as it is subjected to a work cycle. The fold and flex are important in that during a normal work cycle the slope of the force vs. travel curve of FIG. 3 must remain as flat as possible. This is done by controlling the contact surfaces or loaded areas, such as 80 and 82. As long as these loaded areas do not increase or decrease during the operating cycle, their existence will contribute or withdraw little from the slope of the curve. The combined effect of elastomer springs in series, and fold or flex of the elastomer, and the generally constant loaded areas result in the low spring rate or flat force versus travel curve as in FIG. 3. This low spring rate is of great importance in order to satisfy the unique demands of articulated cars. A high spring rate would result in possible derailment while the car is traversing a super elevated curve or in the case of the worn articulated connection as previously described.

As stated, the elastomeric spring is so designed so that throughout its total travel from free height, it is folding and flexing rather than compressing. The loaded area remains essentially the same throughout its total travel. This is accomplished by designing the pre-formed thermoplastic elastomeric spring so that the outside diameter minus the inside diameter is less than the solid height within the side bearing.

Figure 4:
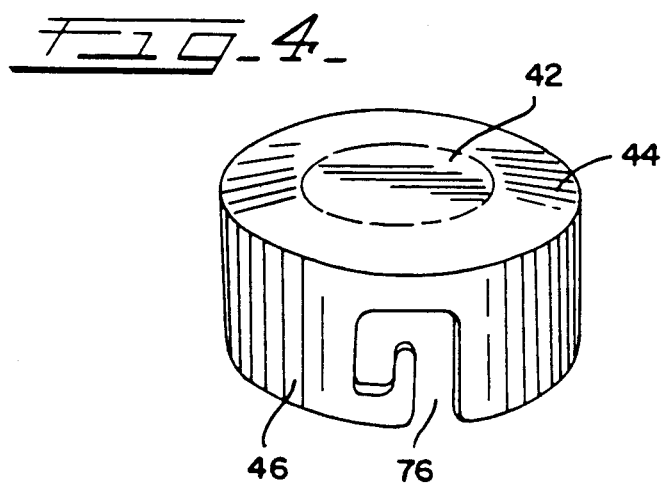
FIG. 4 is a perspective view of the top cap.
Figure 5:
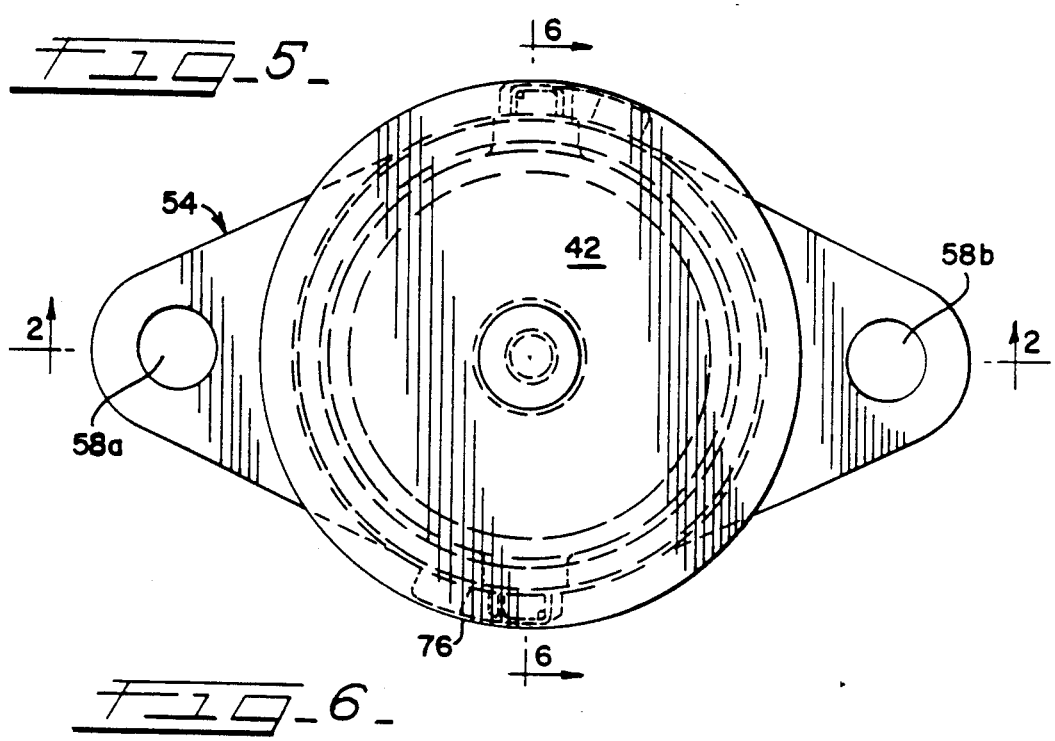
FIG. 5 is a plan view of the side bearing unit from the top.

As will be hereafter discussed, a requirement of this invention is that the round top cap 32 must be able to move vertically with respect to the housing and yet sustain a preload on the first and second thermoplastic elastomeric springs 36 and 38. The means for movably connecting 74 is shown in FIGS. 4, 5 and 6. It includes a basically J-shaped slot 76, cut in the downwardly depending integrally formed side wall 46, which cooperates with a pin 78 (FIG. 6) secured to the upwardly extending side wall 60. By this means the first and second thermoplastic elastomeric springs 36 and 38 can be preloaded, the preload maintained and yet the top cap can move vertically as it is subjected to external forces during a work cycle.

Figure 3:
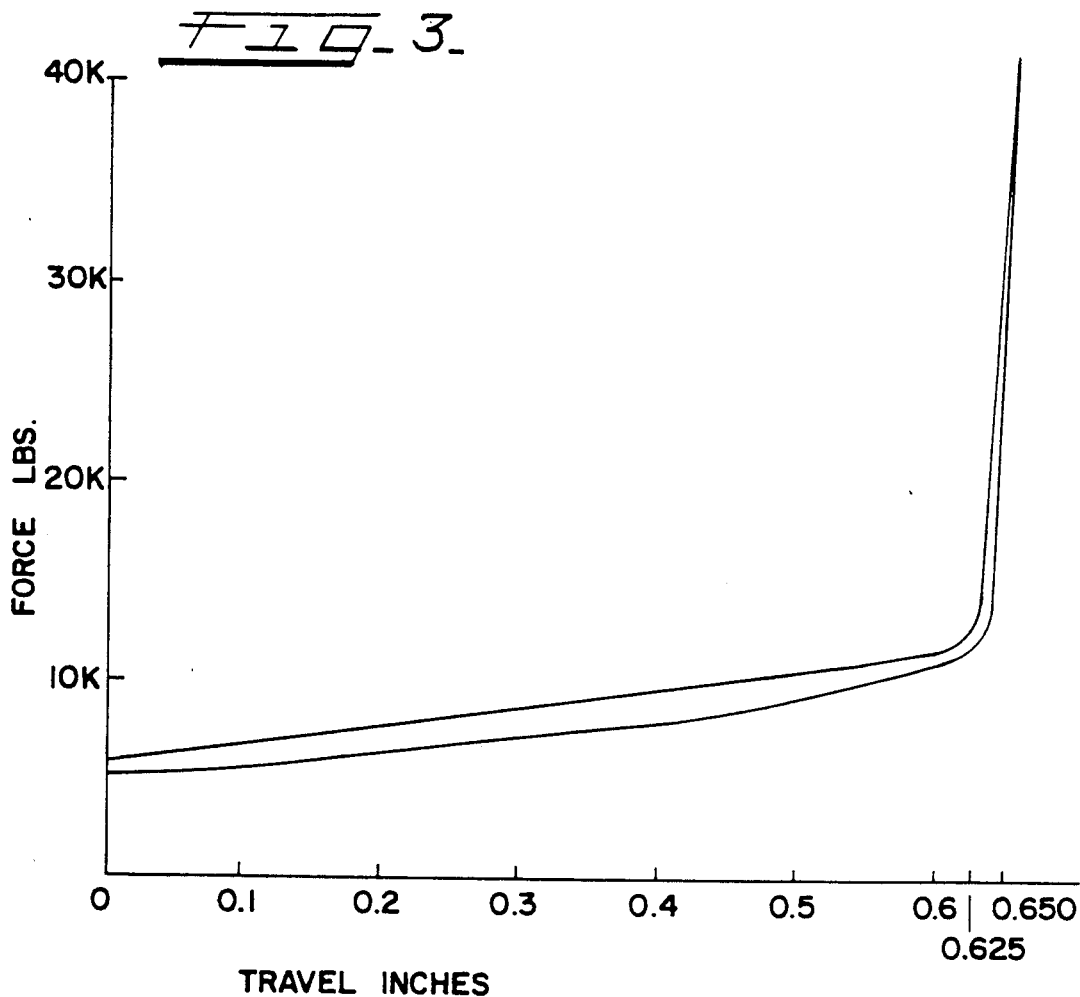
FIG. 3 is a simple graph showing the travel distance versus the increase in resistive forces of the side bearing unit.

Referring now to the force versus travel graph shown in FIG. 3. Because of the preload, the initial resistive force recorded is naturally not zero. The resistive force, however, increases only minimally with the addition of further external force until the amount of travel passes beyond point 0.6". Because of the nature of the curve of FIG. 3, the forces between car, the side bearings and the truck remain generally constant if wear takes place, if the cars are loaded or unloaded, or if the track is rough or banked. Depending upon conditions the top cap 40 bottoms upon the solid stops somewhere around 0.625" travel. The resistive forces then go substantially straight up since it is a metal-against-metal situation. FIG. 3 dramatically shows the results of the particular combination of elements in the invention hereunder consideration. Approximately a full $\frac{5}{8}$" of travel is allowed from installed height and yet the resistant forces do not become elevated to the point where there is a danger of derailment or that the threshold speed of truck hunting is greatly affected.

While the invention has been described with respect to various specific examples and embodiments, it should be understood that the invention is not limited hereto, and that it can be variously practiced within the scope of the claims.

I claim:

1. A side bearing unit for use with an articulated railroad car which includes a bolster, said side bearing unit comprising:

a generally round top cap including, a top surface having a center flat portion and a side angled portion, a downwardly depending integrally formed side wall, a bottom surface having a centrally located integrally formed depending secondary solid stop and a primary stop surface adjacent said side wall;

a housing including, a base portion prepared for attachment to said bolster, an integrally formed upward extending side wall having a primary stop portion for cooperation with said primary stop surface adjacent said side wall, a centrally located integrally formed upwardly extending secondary solid stop for cooperation with said depending secondary stop of said bottom surface, whereby said housing fits within said round top cap creating an internal void;

first and second thermoplastic elastomeric springs positioned one on top of the other occupying said internal void, whereby during a total travel cycle, said first and second thermoplastic springs are subjected to folding and flexing, wherein said centrally located integrally formed depending secondary solid stop is journaled in said first thermoplastic spring and said centrally located integrally formed upward extending secondary solid stop is journaled in said second thermoplastic elastomeric spring; and means for movably interlocking said round top cap and said housing whereby when said first and second thermoplastic elastomeric springs are preloaded, a generally flat force versus travel curve is generated for a substantial amount of the movement available between said top cap with respect to said housing.

2. The side bearing unit of claim 1 wherein:

said centrally located integrally formed upward extending secondary solid stop extends substantially midway between said base and said plate, and said substantial amount of movement available between said top cap with respect to said housing is in excess of about $\frac{5}{8}$ inch.

* * * * *